United States Patent
Brandenstein et al.

Patent Number: 5,078,655
Date of Patent: Jan. 7, 1992

[54] PRECALIBRATION OF DRIVE BELT TENSION

[75] Inventors: Manfred Brandenstein, Eussenheim; Roland Haas, Hofheim; Gerhard Herrmann, Schweinfurt; Armin Olschewski, Schweinfurt, all of Fed. Rep. of Germany

[73] Assignee: SKF GmbH, Schweinfurt, Fed. Rep. of Germany

[21] Appl. No.: 495,494

[22] Filed: Mar. 19, 1990

[30] Foreign Application Priority Data

Mar. 17, 1989 [DE] Fed. Rep. of Germany ....... 3908817

[51] Int. Cl.⁵ .................................................. F16H 7/22
[52] U.S. Cl. ................................... 474/102; 474/107; 474/133
[58] Field of Search ............... 474/101, 102, 106, 133, 474/109, 133, 113, 114, 115, 117, 135, 107

[56] References Cited

U.S. PATENT DOCUMENTS

| | | | |
|---|---|---|---|
| 4,411,638 | 10/1983 | Wilson | 474/138 |
| 4,478,595 | 10/1984 | Hayakawa et al. | 474/109 |
| 4,702,727 | 10/1987 | Dahm | 474/101 |
| 4,767,383 | 8/1988 | St. John | 474/133 |

FOREIGN PATENT DOCUMENTS 3419969 7/1985 Fed. Rep. of Germany .

Primary Examiner—Ramon S. Britts
Assistant Examiner—Roger J. Schoeppel
Attorney, Agent, or Firm—Rosen, Dainow & Jacobs

[57] ABSTRACT

A method for adjusting the tension of a drive belt wherein a tensioning device is pretensioned, e.g., after manufacturing at the plant, with a force corresponding to the force desired for subsequent operation. At this position, calibration markings are formed which can be checked during subsequent adjustments. After being mounted, the drive belt is tensioned until the markings line up.

6 Claims, 1 Drawing Sheet

PRECALIBRATION OF DRIVE BELT TENSION

FIELD OF THE INVENTION

This invention is directed to a method for adjusting the tension of a drive belt.

BACKGROUND OF THE INVENTION

DE-OS 3 419 969 discloses a spring-controlled tensioning device that may be adjusted during operation. This device consists essentially of a journal bearing which is fixed during operation and, attached thereto, a hub moving at an angle with an eccentric tension roller and a spring located between the carrying units and the hub. The spring causes the tension roller to be preloaded against a drive belt and automatically compensates for any changes in tension of the drive belt during operation. The carrying unit runs on bearings on a pin and can be adjusted via a lever through a movable angle, by means of an adjusting screw.

This system allows adjustment of the predetermined tension. In order to obtain as uniform a tension as possible in mass production, the carrier is provided with an indicator operating in conjunction with a scale on the hub. Accordingly, a predetermined angle of rotation is set by the adjusting screw, with reference to a zero setting. This method provides a uniform tension force in mass production only if springs having relatively small tolerances are used and if no changes in spring characteristics are expected during final mounting, or as a result of other components that could affect tolerances. This cannot be avoided in mass production, however, so that the pre-determined tension forces achieved with the prior devices, and according to the above described adjustment method, are widely distributed. The prior devices are subject to great variations in belt drive mechanisms insofar as interference and temperature compensation during operation are concerned, in particular with regard to wear and tear.

SUMMARY OF THE INVENTION

The object of the invention is thereby to provide a method for adjusting the tension of a drive belt which enables the adjustment of tension forces in mass production with minimal deviation, and which does not require additional adjustments.

The method in accordance with the invention provides a tension force which remains uniform within narrow limits, and which compensates for all component part tolerances of the tensioning device itself, as well as of the drive and side gears, and the drive belt. Even the inner elasticity of the drive belt, which must also be taken into account, is compensated for in an advantageous manner.

The method according to the invention provides satisfactory adjustment of the tension, especially when metal flat coil springs are employed which as a rule are extremely difficult to manufacture within narrow tolerances.

After being assembled, the tensioning device is adjusted in an accessory device to have a given specific force that corresponds to the desired tension force during operation. The components of the tensioning device, e.g. carrying units and hubs, which pivot relative to one another, e.g., at an angle, are provided with markings which are visible during mounting of the tensioning device. After mounting of the tensioning device on an engine block or the like, these markings can be brought again into alignment by tensioning the tensioning device, to enable the setting of the pre-determined tension force in a simple manner.

Obviously a wide variety of markings can be used, e.g., indicators, projections, notches, adhesive markings, etc. In addition, it is possible, in the first step following the assembly, when markings or adjustable angle positions have already been defined, to readjust and fix the spring in such a manner that the desired tension force is obtained.

According to a further feature of the invention, the adjustment is effected at the tension roller, with the position of the roller being subsequently fixed. Alternatively the adjustment may be effected at the drive or side gear components. Quite frequently the adjustment may be made on a component of the belt drive mechanism.

In motor vehicles this adjustment may be made, e.g., with an alternator having a mounting that allows it to pivot with respect to an elongated slot. In this case, a tensioning device is provided whose mounting is fixed, but which can move in the tension direction against the force of a spring. In the process, the alternator pivots against the drive belt until the markings or the like on the tensioning device are lined up. In other cases, a tensioning device may be provided which can be rotated with respect to the engine block or the like. In this latter case, the tensioning device is pivoted against the drive belt until the markings line up, after which it is fixed in this position.

Special advantages are provided according to a further feature of the invention, when the adjustment is made while the belt drive mechanism is in operation or when a final adjustment is made after a preliminary adjustment and a brief run of the entire belt drive mechanism. By running the entire belt drive mechanism, one is certain to avoid any static friction effects between the drive belt and the drive or side gears, so that, as a result, an even more reliable adjustment in the sense of a narrow range of distribution of tensions is achieved in mass production.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
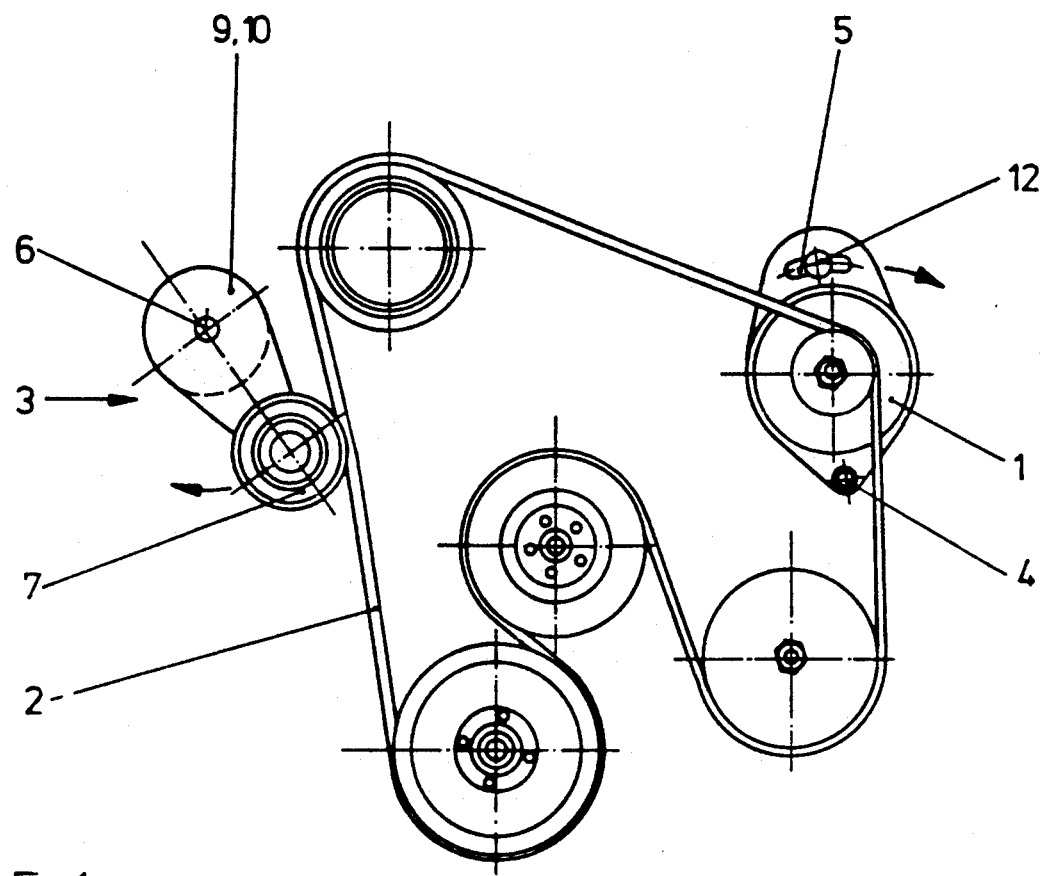
FIG. 1 is a top view of a belt drive mechanism for a combustion engine.

The belt drive mechanism shown in FIG. 1 includes only the parts which are needed for an explanation of the invention. The mechanism is mounted, for example, at the front of a combustion engine and connected to the crankshaft, the camshaft, the alternator 1 and other components thereof. As illustrated in FIG. 1, the drive belt 2 is tensioned by a tensioning device 3 which is adjusted automatically by a spring. This adjustment may be effected by pivoting the alternator 1. For this purpose the alternator may have a pivot pin 4 at one side thereof, and an elongated adjustment slot 5 opposite the pivot pin 4.

Figure 2:
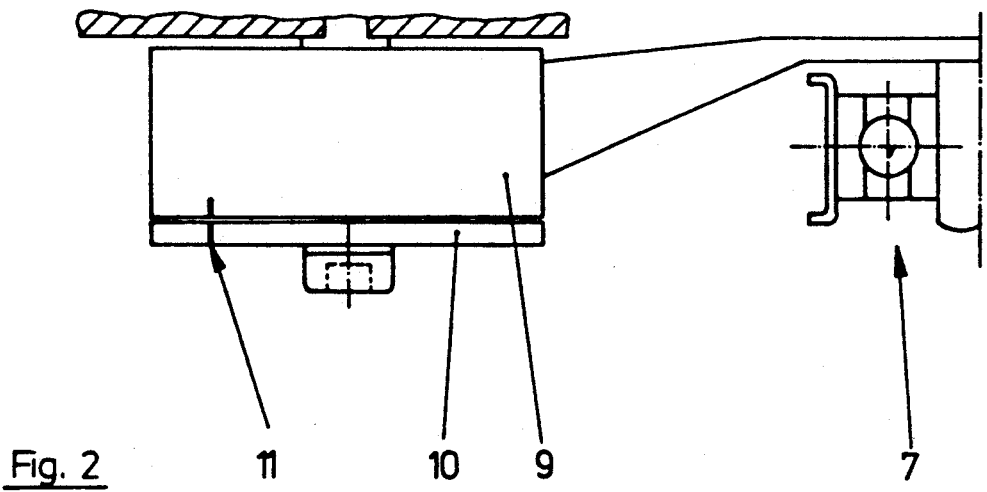
FIG. 2 is an enlarged side view of the tensioning device employed in FIG. 1.

FIG. 2 illustrated a slightly enlarged embodiment of the tensioning device 3. It is pivotable about a pivot bearing that is attached to the engine, and has a tension roller 7 that is eccentrically mounted with respect to the pivot bearing. A flat coil spring (not illustrated) is wound around the pivot bearing 6 to bias the tension roller 7 against the drive belt 2. The pivot bearing 6 and the flat coil spring are housed in a housing 9 which moves with the pivot arm of the tensioning device 3. The housing is closed and has a fixed cover 10.

The tensioning device 3 forms a compact unit which, after assembly, is loaded or pre-tensioned in an accessory apparatus (not illustrated) with the tension force desired during operation. The accessory apparatus may be comprised of a frame or the like of holding the device while it is being pretensioned, and an arrangement for measuring the force on the spring as it is being pretensioned. During the pretensioning of the device 3, the flat coil spring is loaded and the housing 9 is rotated with respect to the cover 10, to attain the desired pretension, by employing a simulated pivoting motion. In this rotated position, notches 11 or other markings are formed in the housing 9 and the cover 10, as shown in FIG. 2. Subsequently, the tension of the tensioning device 3 is released and the device is removed from the accessory apparatus.

During the final mounting of the tensioning device, shown as self-contained in FIG. 1, the tensioning device 3 is attached to the engine block at a pre-arranged position. This mounting step does not yet determine the final tension force. The drive belt 2 is then tensioned by pivoting the alternator 1 in the direction of the arrow adjacent the alternator, around the pivoting pin 4 and within the range of the elongated slot 5. This tensioning extends the section of drive belt 2 in the area of the tensioning device, causing the tension roller 7 to pivot in the direction of the arrow adjacent the tensioning roller. The adjustment process is completed in the manner described when the notches 11 in the housing 9 and cover 10 are aligned. In this position the tension force set in the aforementioned accessory apparatus acts on the drive belt 2. Subsequently, the locking bolt 12 of the alternator 1 is tightened. The process described above can be repeated after a test run, or be carried out while the belt drive mechanism is in operation.

While the invention has been disclosed and described with reference to a single embodiment, it will be apparent that variations and modifications may be made therein, and it is therefore intended in the following claims to cover each such variation and modification as falls within the true spirit and scope of the invention.

What is claimed is:

1. A method for adjusting the tension of a drive belt extending between at least one component and tensioned by a tensioning device, the tensioning device having a spring and a tension roller wherein, at least during adjustment, the tension roller is held against the drive belt by the spring and can move in the direction of the resultant tension force between the roller and the belt, said method comprising;
   tensioning the spring after the tensioning device has been manufactured, to simulate an adjustment position thereof with a force corresponding to a predetermined force on said belt in operation, before engaging said roller with said belt,
   then applying markings to the tensioning device which define said adjustment position,
   then releasing said predetermined force on said spring of said tensioning device, and then
   adjusting the tension of the tensioning device after mounting thereof with said roller engaging said belt, by tensioning the drive belt until said markings on the tensioning device correspond to said adjustment position.

2. The method of claim 1, comprising:
   fixing the adjustment setting of the tension device, after manufacturing, at a position which can always be retried by means of said markings and which corresponds to an operating position of said belt,
   tensioning of the spring with a desired tension force and fixing this position of the tensioning device, and
   adjusting the tension after the final mounting by tensioning the drive belt until the markings on the tensioning device are aligned.

3. The method of claim 1 wherein said step of adjusting the tension after final mounting comprises adjusting the position of the tensioning device, and then fixing the position of tensioning device.

4. The method of claim 1 wherein said step of adjusting the tension after final mounting comprises adjusting said component to vary the tension of said drive belt.

5. The method of claim wherein said step of adjusting after final mounting comprises adjusting the said tension after final mounting while the drive belt is in motion.

6. The method of claim 1 wherein said step of adjusting the tension after final assembly comprises adjusting the tension after a preliminary adjustment and a short run of the belt drive.

* * * * *